(12) United States Patent
Lee et al.

(10) Patent No.: US 11,261,128 B2
(45) Date of Patent: Mar. 1, 2022

(54) LOW-REFLECTION COATING GLASS

(71) Applicant: KCC Corporation, Seoul (KR)

(72) Inventors: Hyounjoo Lee, Busan (KR); Hyunmin Kang, Suwon-si (KR); Sanglool Kim, Yeoju-si (KR); Younghoon Oh, Seoul (KR); Yunhee Yun, Anseong-si (KR)

(73) Assignee: KCC Glass Corporation, Seoul (KR)

( * ) Notice: Subject to any disclaimer, the term of this patent is extended or adjusted under 35 U.S.C. 154(b) by 135 days.

(21) Appl. No.: 16/483,216

(22) PCT Filed: Feb. 9, 2018

(86) PCT No.: PCT/KR2018/001732
§ 371 (c)(1),
(2) Date: Aug. 2, 2019

(87) PCT Pub. No.: WO2018/147666
PCT Pub. Date: Aug. 16, 2018

(65) Prior Publication Data
US 2020/0231495 A1    Jul. 23, 2020

(30) Foreign Application Priority Data
Feb. 10, 2017   (KR) .................. 10-2017-0018885

(51) Int. Cl.
*G02B 1/115* (2015.01)
*C03C 17/36* (2006.01)
(Continued)

(52) U.S. Cl.
CPC ...... *C03C 17/3657* (2013.01); *C03C 17/3417* (2013.01); *C03C 17/3435* (2013.01);
(Continued)

(58) Field of Classification Search
CPC ........... G02B 1/11; G02B 1/113; G02B 1/115; G02B 5/208; G02B 5/281; G02B 5/282;
(Continued)

(56) References Cited

U.S. PATENT DOCUMENTS 6,165,598 A    12/2000  Nelson
6,924,037 B1 *  8/2005  Joret ................. B32B 17/10174
                                                    428/432
(Continued)

FOREIGN PATENT DOCUMENTS

CN    1665753 A    9/2005
CN    1867522 A   11/2006
(Continued)

OTHER PUBLICATIONS

International Search Report issued in corresponding International Patent Application No. PCT/KR2018/001732 dated May 21, 2018.

*Primary Examiner* — Z. Jim Yang
(74) *Attorney, Agent, or Firm* — Morgan, Lewis & Bockius LLP

(57) ABSTRACT

The present invention provides low-reflection coating glass in which a dielectric layer having a higher refractive index and a dielectric layer having a lower refractive index are stacked alternately on a glass substrate.

9 Claims, 3 Drawing Sheets

(51) Int. Cl.
  *C03C 17/34* (2006.01)
  *E06B 9/24* (2006.01)
  *G02B 1/11* (2015.01)

(52) U.S. Cl.
  CPC .................. *E06B 9/24* (2013.01); *G02B 1/11* (2013.01); *C03C 2217/212* (2013.01); *C03C 2217/213* (2013.01); *C03C 2217/734* (2013.01); *E06B 2009/2417* (2013.01)

(58) Field of Classification Search
  CPC ........... C03C 2217/734; C03C 17/3411; C03C 17/3417; C03C 17/3423; C03C 17/3435; C03C 17/225; C03C 17/23–17/256; B32B 17/10201
  See application file for complete search history.

(56) References Cited

U.S. PATENT DOCUMENTS

| | | | |
|---|---|---|---|
| 7,005,188 B2 | 2/2006 | Anderson et al. | |
| 7,910,215 B2 | 3/2011 | Reymond et al. | |
| 8,039,065 B2 | 10/2011 | Ikeda et al. | |
| 8,287,994 B2 | 10/2012 | Fukawa et al. | |
| 9,079,802 B2 | 7/2015 | Bellman et al. | |
| 9,359,261 B2 | 6/2016 | Bellman et al. | |
| 2001/0031365 A1* | 10/2001 | Anderson | G02B 1/18 428/432 |
| 2006/0139757 A1 | 6/2006 | Harris et al. | |
| 2006/0165963 A1 | 7/2006 | Fleury et al. | |
| 2007/0146887 A1 | 6/2007 | Ikeda et al. | |
| 2007/0188871 A1* | 8/2007 | Fleury | C03C 17/3435 359/586 |
| 2008/0206533 A1* | 8/2008 | Yaoita | B32B 17/10761 428/216 |
| 2009/0104385 A1* | 4/2009 | Reymond | B32B 17/10174 428/34 |
| 2010/0208338 A1* | 8/2010 | Banerjee | G02B 5/283 359/359 |
| 2011/0033679 A1 | 2/2011 | Fukawa et al. | |
| 2011/0033681 A1* | 2/2011 | Adachi | G02B 1/115 428/212 |
| 2011/0228214 A1* | 9/2011 | von Blanckenhagen | B29D 11/00923 351/159.24 |
| 2012/0154916 A1* | 6/2012 | Nishimoto | G02B 1/115 359/580 |
| 2013/0022798 A1 | 1/2013 | Fukawa et al. | |
| 2013/0271836 A1* | 10/2013 | Fukaya | G02B 1/14 359/507 |
| 2014/0022630 A1* | 1/2014 | Reymond | C03C 17/366 359/360 |
| 2014/0049827 A1* | 2/2014 | Fujii | G02B 1/113 359/586 |
| 2014/0085701 A1* | 3/2014 | Selles | C03C 17/23 359/275 |
| 2014/0087101 A1* | 3/2014 | Tixhon | E06B 3/66 428/34 |
| 2014/0113120 A1* | 4/2014 | Thiel | C03C 17/3663 359/584 |
| 2014/0226208 A1* | 8/2014 | Vikor | C03C 17/3663 359/584 |
| 2014/0335330 A1 | 11/2014 | Bellman et al. | |
| 2014/0335335 A1* | 11/2014 | Koch, III | G02B 1/10 428/213 |
| 2015/0116264 A1* | 4/2015 | Ookawa | G06F 3/0445 345/174 |
| 2015/0293284 A1* | 10/2015 | Tatemura | G02B 5/283 359/359 |
| 2015/0322270 A1* | 11/2015 | Amin | C03C 17/3435 428/141 |
| 2015/0323705 A1* | 11/2015 | Hart | G02B 27/0025 359/580 |
| 2015/0369966 A1* | 12/2015 | Kishi | G02B 1/11 428/212 |
| 2017/0102601 A1* | 4/2017 | Luten | G02F 1/155 |
| 2017/0320294 A1* | 11/2017 | Yamamoto | B32B 17/06 |
| 2017/0357033 A1* | 12/2017 | Ockenfuss | C23C 14/3457 |
| 2018/0011225 A1* | 1/2018 | Bellman | C23C 14/0078 |
| 2018/0045857 A1* | 2/2018 | Hayashi | C03C 17/3636 |
| 2018/0149786 A1* | 5/2018 | Lee | B32B 17/06 |
| 2018/0297890 A1* | 10/2018 | Ding | C03C 17/3636 |
| 2019/0137660 A1* | 5/2019 | Ding | G02B 1/11 428/212 |
| 2019/0171039 A1* | 6/2019 | Ding | C03C 17/366 359/360 |

FOREIGN PATENT DOCUMENTS

| | | |
|---|---|---|
| CN | 101356455 A | 1/2009 |
| CN | 203287553 U | 11/2013 |
| CN | 105585253 A | 5/2016 |
| JP | S57-140152 A | 8/1982 |
| JP | S60-027623 A | 2/1985 |
| JP | S60-064843 A | 4/1985 |
| JP | 2003-500249 A | 1/2003 |
| JP | 2005-531814 A | 10/2005 |
| JP | 2007-501766 A | 2/2007 |
| JP | 2015-206908 A | 11/2015 |
| KR | 10-1996-0004250 A | 2/1996 |
| KR | 10-2001-0074731 A | 8/2001 |
| KR | 10-2005-0024457 A | 3/2005 |
| KR | 10-2006-0111622 A | 10/2006 |
| KR | 10-2008-0023888 A | 3/2008 |
| KR | 10-2008-0102154 A | 11/2008 |
| KR | 10-2010-0135837 A | 12/2010 |
| KR | 10-2016-0087930 A | 7/2016 |
| WO | 2015/175390 A1 | 11/2015 |

* cited by examiner

[FIG. 1]
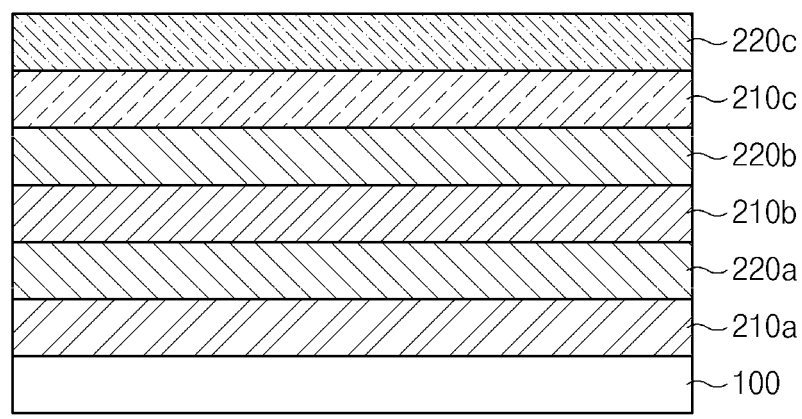
[FIG. 2]
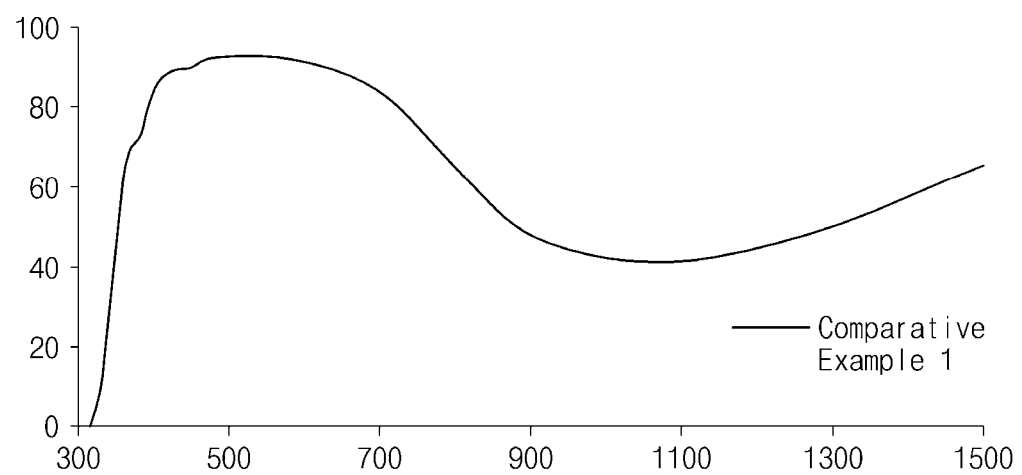

[FIG. 3]
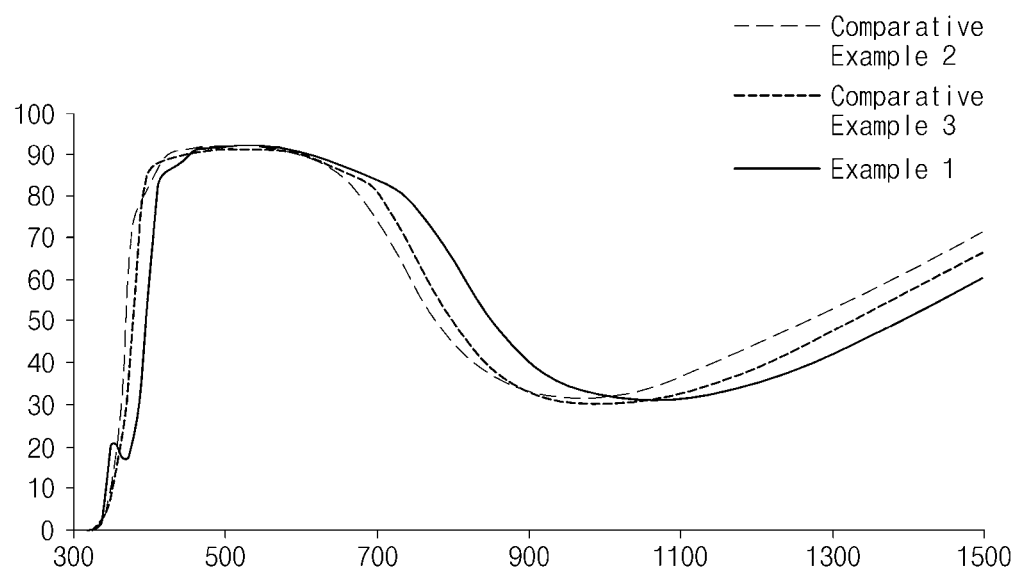
[FIG. 4]
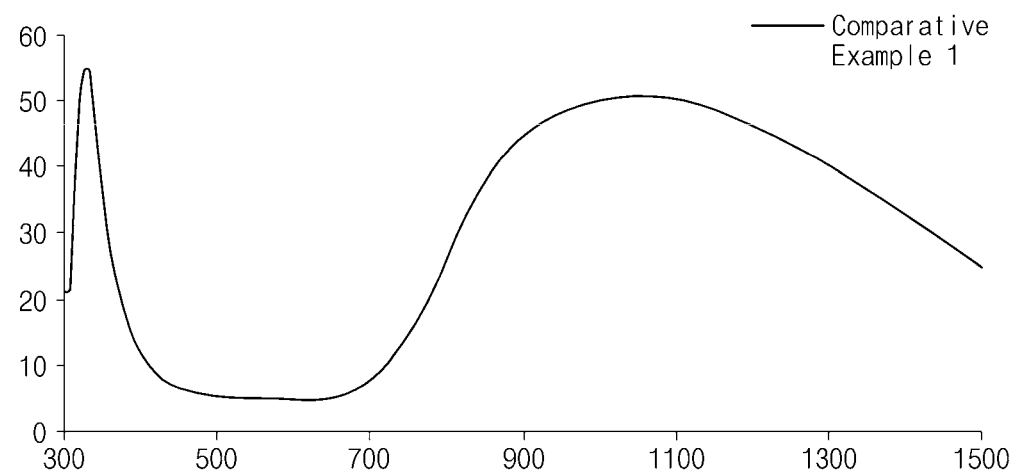

[FIG. 5]
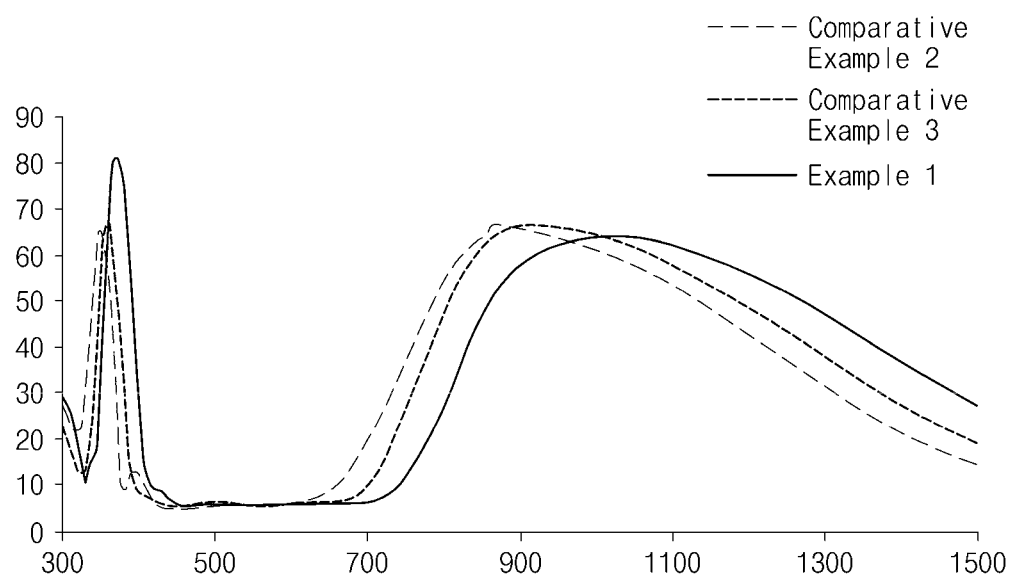

LOW-REFLECTION COATING GLASS

TECHNICAL FIELD

The present invention relates to a low-reflection coating glass.

BACKGROUND ART

A low-reflection coating glass, which is a functional glass with low visible-light reflectance and thus exhibits reduced glare and improved visibility, is widely used in areas including lenses, windowpanes, decorative glass, displays, and the like.

There has been disclosed a low-reflection coating glass having a lamination structure including, on a glass substrate, a dielectric layer having a higher refractive index and a dielectric layer having a lower refractive index which have been deposited using a sputtering method [see Korean Patent Publication No. 2010-0135837]. However, such a low-reflection coating glass generally has a disadvantage in that it exhibits low infrared reflectance and a low infrared-blocking ratio and therefore, when applied to a display installed outdoors, such as in the case of a large format display (LFD), it is greatly affected by infrared rays due to sunlight.

Meanwhile, an infrared-shielding coating glass developed for the purpose of blocking the infrared rays may satisfy a requirement of high shielding ability in the infrared region, but has a problem in that it exhibits low visible-light transmittance and low visible-light reflectance and the sides thereof appear reddish.

Accordingly, there is a demand for the development of a low-reflection coating glass which not only exhibits a high infrared-blocking ratio while exhibiting low visible-light reflectance but also exhibits a neutral color when viewed from the side.

DISCLOSURE

Technical Problem

The present invention is directed to providing a low-reflection coating glass which not only exhibits a high infrared-blocking ratio while exhibiting low visible-light reflectance but also exhibits a neutral color when viewed from the side.

Technical Solution

Provided is a low-reflection coating glass that comprises a glass substrate and an alternate lamination of a dielectric layer having a higher refractive index of 2.0 or more and a dielectric layer having a lower refractive index of 1.6 or less which is provided on the glass substrate, exhibits a visible-light reflectance of 6% or less and an infrared-blocking ratio of 50% or more, and realizes a neutral color characterized by $|a^*|\leq10$ and $|b^*|\leq10$ upon observation at an angle of 30° to 50° to the side.

In one embodiment of the present invention, the low-reflection coating glass may comprise a glass substrate, a first dielectric layer provided on the glass substrate and having a higher refractive index of 2.0 or more and a thickness of 5 nm to 15 nm, a second dielectric layer provided on the first dielectric layer and having a lower refractive index of 1.6 or less and a thickness of 200 nm to 220 nm, a third dielectric layer provided on the second dielectric layer and having a higher refractive index of 2.0 or more and a thickness of 105 nm to 135 nm, a fourth dielectric layer provided on the third dielectric layer and having a lower refractive index of 1.6 or less and a thickness of 175 nm to 200 nm, a fifth dielectric layer provided on the fourth dielectric layer and having a higher refractive index of 2.0 or more and a thickness of 100 nm to 115 nm, and a sixth dielectric layer provided on the fifth dielectric layer and having a lower refractive index of 1.6 or less and a thickness of 75 nm to 85 nm.

Advantageous Effects

The low-reflection coating glass of the present invention not only can exhibit a high infrared-blocking ratio while exhibiting low visible-light reflectance but also can exhibit a neutral color when viewed from the side. Therefore, the low-reflection coating glass of the present invention can be advantageously applied to a display installed outdoors, such as an LFD.

DESCRIPTION OF DRAWINGS

FIG. 1 is a cross-sectional view for schematically illustrating a low-reflection coating glass according to one embodiment of the present invention.

FIG. 2 is a graph showing the transmittance spectrum of a low-reflection coating glass produced according to Comparative Example 1.

FIG. 3 is a graph showing the transmittance spectra of low-reflection coating glasses produced according to Example 1, Comparative Examples 2 and 3.

FIG. 4 is a graph showing the reflectance spectrum of a low-reflection coating glass produced according to Comparative Example 1.

FIG. 5 is a graph showing the reflectance spectra of low-reflection coating glasses produced according to Example 1, Comparative Examples 2 and 3.

MODES OF THE INVENTION

Hereinafter, the present invention will be described in more detail with reference to the accompanying drawings.

In one embodiment thereof, the present invention relates to a low-reflection coating glass comprising an alternate lamination of a dielectric layer having a higher refractive index and a dielectric layer having a lower refractive index which is provided on a glass substrate.

In one embodiment thereof, the present invention relates to a low-reflection coating glass that comprises a glass substrate and an alternate lamination of a dielectric layer having a higher refractive index of 2.0 or more and a dielectric layer having a lower refractive index of 1.6 or less which is provided on the glass substrate, exhibits a visible-light reflectance of 6% or less and an infrared-blocking ratio of 50% or more, and realizes a neutral color characterized by $|a^*|\leq10$ and $|b^*|\leq10$ upon observation at an angle of 30° to 50° to the side.

Here, the alternate lamination may comprise one or more, for example two to five, and particularly three, repeated sets each comprising a dielectric layer having a higher refractive index and a dielectric layer having a lower refractive index. When it is mentioned that there are three repeated sets in the alternate lamination, it may mean that there is a total of six layers, including three dielectric layers having a higher refractive index and three dielectric layers having a lower refractive index.

The above-described visible-light reflectance refers to the fraction of incident visible light that is reflected at a low-reflection coating glass surface, and a higher numerical value thereof is associated with lower glare and more improved visibility.

As used herein, the term "visible light" may refer to the light of 380 nm to 780 nm in wavelength.

The visible-light reflectance may be obtained by measuring the reflectance in the visible-light wavelength region using a spectrophotometer. For example, the visible-light reflectance may be a value obtained in the 380 nm to 780 nm range using a spectrophotometer in accordance with the KS L 2514 standard, as in the case of an experimental example to be described below.

When a low-reflection coating glass according to one embodiment of the present invention exhibits a visible-light reflectance of greater than 6%, relatively low visibility may be exhibited, and glare may occur.

Meanwhile, the above-described infrared-blocking ratio refers to the fraction of incident infrared rays that are blocked by the low-reflection coating glass surface, and a lower numerical value thereof is associated with a more improved heat-shielding property.

As used herein, the term "infrared ray(s)" may refer to the light of 0.78 μm to several hundred μm in wavelength, for example, 780 nm to 2,500 nm.

The infrared-blocking ratio is defined as (100-infrared transmittance) %, and may be obtained by measuring the transmittance in the infrared wavelength region using a spectrophotometer and carrying out the calculation according to the above-described equation. For example, the infrared-blocking ratio may be a value obtained by subtracting, from 100, the infrared transmittance value obtained at 780 nm to 2,500 nm using a spectrophotometer in accordance with the KS L 2514 standard as in the case of an experimental example to be described below.

When a low-reflection coating glass according to one embodiment of the present invention exhibits an infrared-blocking ratio of less than 50%, a relatively low heat-shielding property may be exhibited.

Meanwhile, the observation at an angle of 30° to 50° to the side as described above means that the observation is carried out at an angle of 30° to 50° with respect to the incidence of light that is normal to the low-reflection coating glass surface.

In this case, the a* value represents the green-red component, wherein an increase in value thereof (i.e., the value becomes more positive) indicates that the color is closer to the red series, and a decrease in value thereof (i.e., the value becomes more negative) indicates that the color is closer to the green series. On the other hand, the b* value represents the blue-yellow component, wherein an increase in value thereof (i.e., the value becomes more positive) indicates that the color is closer to the yellow series, and a decrease in value thereof (i.e., the value becomes more negative) indicates that the color is closer to the blue series.

When a low-reflection coating glass according to one embodiment of the present invention exhibits a color characterized by |a*|>10 and/or |b*|>10 upon observation at an angle of 30° to 50° to the side, it may be difficult to realize a neutral color because the sides of the low-reflection coating glass may exhibit red or one of various other colors.

In one embodiment of the present invention, the above-described glass substrate may be made of a conventional glass material (e.g., soda lime glass, soda-lime-silicate glass, and fused silica glass), low-iron patterned glass, low-iron float glass, transparent conductive oxide (TCO) glass, or the like, but the present invention is not limited thereto. In addition, a surface texture treated, reinforced, or partially reinforced glass may be used if necessary. Also, the thickness of the glass material may be freely selected within a range of 1 mm to 10 mm depending on the purpose of use.

In one embodiment of the present invention, the refractive index of the dielectric layer having a higher refractive index of 2.0 or more may be, for example, 2.0 to 2.5.

As used herein, the refractive index is a measurement at a wavelength of 550 nm and is measured by a spectroscopic ellipsometer.

The dielectric layer having a higher refractive index may comprise one or more materials selected from the group consisting of aluminum nitride, a silicon nitride, a silicon-zirconium nitride, a titanium oxide, zinc oxide, a tin oxide, zirconium oxide, zinc-tin oxide, and a niobium oxide.

In one embodiment of the present invention, the refractive index of the dielectric layer having a lower refractive index of 1.6 or less may be, for example, 1.3 to 1.6.

The dielectric layer having a lower refractive index may comprise one or more materials selected from the group consisting of a silicon oxide, a silicon oxynitride, a silicon oxycarbide, and a silicon-aluminum mixed oxide.

FIG. 1 is a cross-sectional view for schematically illustrating a low-reflection coating glass according to one embodiment of the present invention.

Referring to FIG. 1, a low-reflection coating glass according to one embodiment of the present invention comprises a glass substrate 100, and a first dielectric layer 210a, a second dielectric layer 220a, a third dielectric layer 210b, a fourth dielectric layer 220b, a fifth dielectric layer 210c, and a sixth dielectric layer 220c which are provided on the glass substrate in the written order.

Each of the first dielectric layer 210a, the third dielectric layer 210b, and the fifth dielectric layer 210c is a dielectric layer having a higher refractive index of 2.0 or more.

When the first dielectric layer 210a, the third dielectric layer 210b, and the fifth dielectric layer 210c have a refractive index of less than 2.0, the low-reflection coating glass may not exhibit the desired level of visible-light transmittance, visible-light reflectance, infrared reflectance, and infrared-blocking ratio.

The refractive indices of the first dielectric layer 210a, the third dielectric layer 210b, and the fifth dielectric layer 210c may be the same or different.

Meanwhile, each of the second dielectric layer 220a, the fourth dielectric layer 220b, and the sixth dielectric layer 220c is a dielectric layer having a lower refractive index of 1.6 or less.

When the second dielectric layer 220a, the fourth dielectric layer 220b, and the sixth dielectric layer 220c have a refractive index of greater than 1.6, the low-reflection coating glass may not exhibit the desired level of visible-light transmittance, visible-light reflectance, infrared reflectance, and infrared-blocking ratio.

The refractive indices of the second dielectric layer 220a, the fourth dielectric layer 220b, and the sixth dielectric layer 220c may be the same or different.

In one embodiment of the present invention, there is provided a low-reflection coating glass which not only exhibits high infrared reflectance and a high infrared-blocking ratio while exhibiting high visible-light transmittance and low visible-light reflectance but also exhibits a neutral color when viewed from the side, the low-reflection coating glass realized by controlling the thickness range of each dielectric layer.

Here, the first dielectric layer 210a may have a thickness of 5 nm to 15 nm, the second dielectric layer 220a may have a thickness of 200 nm to 220 nm, the third dielectric layer 210b may have a thickness of 105 nm to 135 nm, the fourth dielectric layer 220b may have a thickness of 175 nm to 200 nm, the fifth dielectric layer 210c may have a thickness of 100 nm to 115 nm, and the sixth dielectric layer 220c may have a thickness of 75 nm to 85 nm.

When each and every one of the above-described dielectric layer thickness ranges is satisfied, the low-reflection coating glass of the present invention not only can exhibit high infrared reflectance and a high infrared-blocking ratio while exhibiting high visible-light transmittance and low visible-light reflectance but also can exhibit a neutral color when viewed from the side.

In one embodiment of the present invention, each of the dielectric layers may be deposited by a generally-known thin-film coating method such as a physical vapor deposition (PVD) method, a chemical vapor deposition (CVD) method, a sol-gel method, or the like, but the present invention is not limited thereto.

For example, all the layers may be deposited in a continuous manner by a sputtering method. A sputtering method is particularly suitable for products with a large substrate, and is a method in which an oxide layer or a nitride layer is deposited by the reactive sputtering of a corresponding metal in the presence of oxygen or nitrogen, respectively. Further, in the case of $SiO_2$ layer formation, the layer may be deposited using a silicon target and, to impart sufficient conductivity to the target, by doping the target with a small amount of metal such as aluminum (i.e., target is SiAl).

The low-reflection coating glass according to one embodiment of the present invention may exhibit a transmittance in the visible-light region of 90% or more. Accordingly, the low-reflection coating glass according to one embodiment of the present invention may exhibit reduced glare and excellent visibility.

The low-reflection coating glass according to one embodiment of the present invention may exhibit an infrared reflectance of 35% or more. Accordingly, the low-reflection coating glass according to one embodiment of the present invention may exhibit an excellent heat-shielding property.

In addition, the low-reflection coating glass according to one embodiment of the present invention may exhibit a neutral color that becomes increasingly noticeable in areas closer to the sides than in the front. Therefore, the low-reflection coating glass according to one embodiment of the present invention can be more suitably used for the protection of a display such as an LFD than a conventional low-reflection coating glass appearing more reddish toward the sides.

Hereinafter, the present invention will be described in more detail with reference to examples and comparative examples. It should be apparent to those skilled in the art that these examples and comparative examples are provided only to illustrate the present invention, and that the scope of the present invention is not limited to the examples.

Example 1: Preparation of Low-Refection Coating Glass

Each dielectric layer having a thickness as shown in the following Table 1 was deposited on a 6 mm glass substrate, and thereby a low-reflection coating glass having a lamination structure as shown in the accompanying FIG. 1 was prepared. Each of the dielectric layers was deposited using magnetron sputtering equipment. The deposition was performed under the conditions of a chamber pressure of 3 mTorr to 5 mTorr and a power of 1 kW to 3 kW, using $TiO_2$ and SiAl as targets. Accordingly, the first, third, and fifth dielectric layers included titanium oxide having a refractive index of 2.3, and the second, fourth, and sixth dielectric layers included silicon oxide having a refractive index of 1.45.

Comparative Example 1: Preparation of Low-Refection Coating Glass

Each dielectric layer having a thickness as shown in the following Table 1 was formed on a 6-mm glass substrate, and thereby a low-reflection coating glass having a lamination structure as shown in the accompanying FIG. 1 was prepared. Each of the dielectric layers was deposited using magnetron sputtering equipment. The deposition was performed under the conditions of a chamber pressure of 3 mTorr to 5 mTorr and a power of 1 kW to 3 kW. In the coating glass of Comparative Example 1, the first, third, and fifth dielectric layers included titanium oxide having a refractive index of 2.3, the second and fourth dielectric layers included magnesium fluoride ($MgF_2$) having a refractive index of 1.37, and the sixth dielectric layer included silicon oxide having a refractive index of 1.45.

Comparative Examples 2 and 3: Preparation of Low-Refection Coating Glass

A low-reflection coating glass was produced in the same manner as in Example 1, except that the thickness of each dielectric layer was changed as shown in the following Table 1.

TABLE 1

| Layer/thickness (nm) | Example 1 | Comparative Example 1 | Comparative Example 2 | Comparative Example 3 |
|---|---|---|---|---|
| First dielectric layer | 10 | 19 | 10 | 10 |
| Second dielectric layer | 210 | 32 | 200 | 195 |
| Third dielectric layer | 120 | 133 | 100 | 105 |
| Fourth dielectric layer | 185 | 183 | 150 | 170 |
| Fifth dielectric layer | 105 | 102 | 90 | 100 |
| Sixth dielectric layer | 80 | 70 | 75 | 90 |

Experimental Example 1: Transmittance and Reflectance of Low-Reflection Coating Glass The transmittance and reflectance of the low-reflection coating glasses produced according to the Examples and the Comparative Examples were measured, in accordance with the KS L 2514 standard, in the 300 nm to 1,500 nm range using a LAMBDA 950 spectrophotometer (PerkinElmer, Inc., KS L 2514 standard), and the results thereof are shown in the following Table 2 and in FIGS. 2 to 5. The infrared-blocking ratio is defined as (100-infrared transmittance) %. Here, as shown in the following Table 2, the values of visible-light transmittance and visible-light reflectance were obtained in the 380 nm to 780 nm range, and the values of infrared-blocking ratio and infrared reflectance were obtained in the 780 nm to 2,500 nm range.

TABLE 2

|  | Example 1 | Comparative Example 1 | Comparative Example 2 | Comparative Example 3 |
|---|---|---|---|---|
| Visible-light transmittance | 91.4% | 92.3% | 91.4% | 91.1% |
| Visible-light reflectance | 5.2% | 5.2% | 5.3% | 5.6% |
| Infrared-blocking ratio | 50.4% | 44.0% | 51.2% | 52.2% |
| Infrared reflectance | 37.7% | 22.1% | 37.2% | 38.8% |

Referring to Table 2 and FIGS. 2 to 5, it can be seen that the low-reflection coating glass of Example 1 of the present invention exhibited high infrared reflectance and a high infrared-blocking ratio while exhibiting high visible-light transmittance and low visible-light reflectance. In this case, the low-reflection coating glass of Example 1 of the present invention exhibited particularly high infrared reflectance and a high infrared-blocking ratio compared to the low-reflection coating glass of Comparative Example 1.

Experimental Example 2: Colors Reflected from Low-Reflection Coating Glass and Color Change According to Angle The colors reflected from the low-reflection coating glasses of the Examples and the Comparative Examples and a change thereof according to an angle of observation were determined in accordance with the C.I.E. color system. The color difference was determined using a LAMBDA 950 spectrophotometer (PerkinElmer, Inc.) and confirmed using an accessory for capturing colors at various angles. The results are shown in the following Table 3.

TABLE 3

|  |  | Color reflected by coated surface | | | | |
|---|---|---|---|---|---|---|
|  |  | Front | 20° | 30° | 40° | 50° |
| Example 1 | a* | 10.0 | 12.5 | 9.9 | 5.7 | 4.4 |
|  | b* | −13.6 | −12.2 | −3.8 | 0.9 | −7.6 |
| Comparative Example 1 | a* | 10.6 | 3.63 | 3.44 | 10.9 | 16.8 |
|  | b* | −17.9 | −6.5 | −3.21 | 2.06 | 8.11 |
| Comparative Example 2 | a* | 6.5 | 9.8 | 12.9 | 22.0 | 25.0 |
|  | b* | 4.7 | 8.2 | 5.5 | −2.3 | −5.9 |
| Comparative Example 3 | a* | −0.6 | −0.4 | 4.0 | 7.2 | 17.3 |
|  | b* | 4.3 | 3.6 | −6.6 | −9.8 | −16.6 |

Referring to Table 3, it can be seen that in the case of the low-reflection coating glass of Example 1, a neutral color was exhibited in such a manner that it became increasingly noticeable in areas closer to the sides than in the front, whereas in the case of the low-reflection coating glasses of Comparative Examples 1 to 3, the color reflected therefrom became increasingly reddish toward the sides.

While particular embodiments of the present invention have been described in detail, it is clearly understood by those skilled in the art that such detailed descriptions are merely illustrative of the invention and are not intended to limit the scope of the invention thereto. It will be understood by those skilled in the art that various changes and modifications may be made based on the disclosure of the invention without departing from the spirit and scope of the invention.

Accordingly, the actual scope of the invention is defined by the appended claims and their equivalents.

The invention claimed is:

1. A coated glass, comprising
   a glass substrate;
   a first dielectric layer provided on the glass substrate and having a higher refractive index of 2.0 or more and a thickness of 5 nm to 15 nm;
   a second dielectric layer provided on the first dielectric layer and having a lower refractive index of 1.6 or less and a thickness of 200 nm to 220 nm;
   a third dielectric layer provided on the second dielectric layer and having a higher refractive index of 2.0 or more and a thickness of 105 nm to 135 nm;
   a fourth dielectric layer provided on the third dielectric layer and having a lower refractive index of 1.6 or less and a thickness of 175 nm to 200 nm;
   a fifth dielectric layer provided on the fourth dielectric layer and having a higher refractive index of 2.0 or more and a thickness of 100 nm to 115 nm; and
   a sixth dielectric layer provided on the fifth dielectric layer and having a lower refractive index of 1.6 or less and a thickness of 75 nm to 85 nm,
   wherein the coated glass exhibits a visible-light reflectance of 6% or less and an infrared-blocking ratio of 50% or more, and a coating-side off-axis reflection of $|a^*|\leq10$ and $|b^*|\leq10$, wherein the off-axis reflection is taken at an angle of 30° to 50° relative to an axis perpendicular to the coated glass.

2. The coated glass of claim 1, wherein the refractive index of the first, third and fifth dielectric layers having a higher refractive index ranges from 2.0 to 2.5.

3. The coated glass of claim 1, wherein the refractive index of the second, fourth, and sixth dielectric layers having a lower refractive index ranges from 1.3 to 1.6.

4. The coated glass of claim 1, wherein the first, third and fifth dielectric layers having a higher refractive index comprise one or more materials selected from the group consisting of aluminum nitride, a silicon nitride, a silicon-zirconium nitride, a titanium oxide, zinc oxide, a tin oxide, zirconium oxide, zinc-tin oxide, and a niobium oxide.

5. The coated glass of claim 1, wherein the second, fourth, and sixth dielectric layers having a lower refractive index comprise one or more materials selected from the group consisting of a silicon oxide, a silicon oxynitride, a silicon oxycarbide, and a silicon-aluminum mixed oxide.

6. The coated glass of claim 1, which exhibits a visible-light transmittance of 90% or more.

7. The coated glass of claim 1, which exhibits an infrared reflectance of 35% or more.

8. The coated glass of claim 1, wherein the glass substrate comprises at least one material selected from the group consisting of soda lime glass, soda-lime-silicate glass, and fused silica glass.

9. The coated glass of claim 1, wherein the glass substrate comprises at least one material selected from the group consisting of low-iron patterned glass, low-iron float glass, and transparent conductive oxide (TCO) glass.

* * * * *